UNITED STATES PATENT OFFICE.

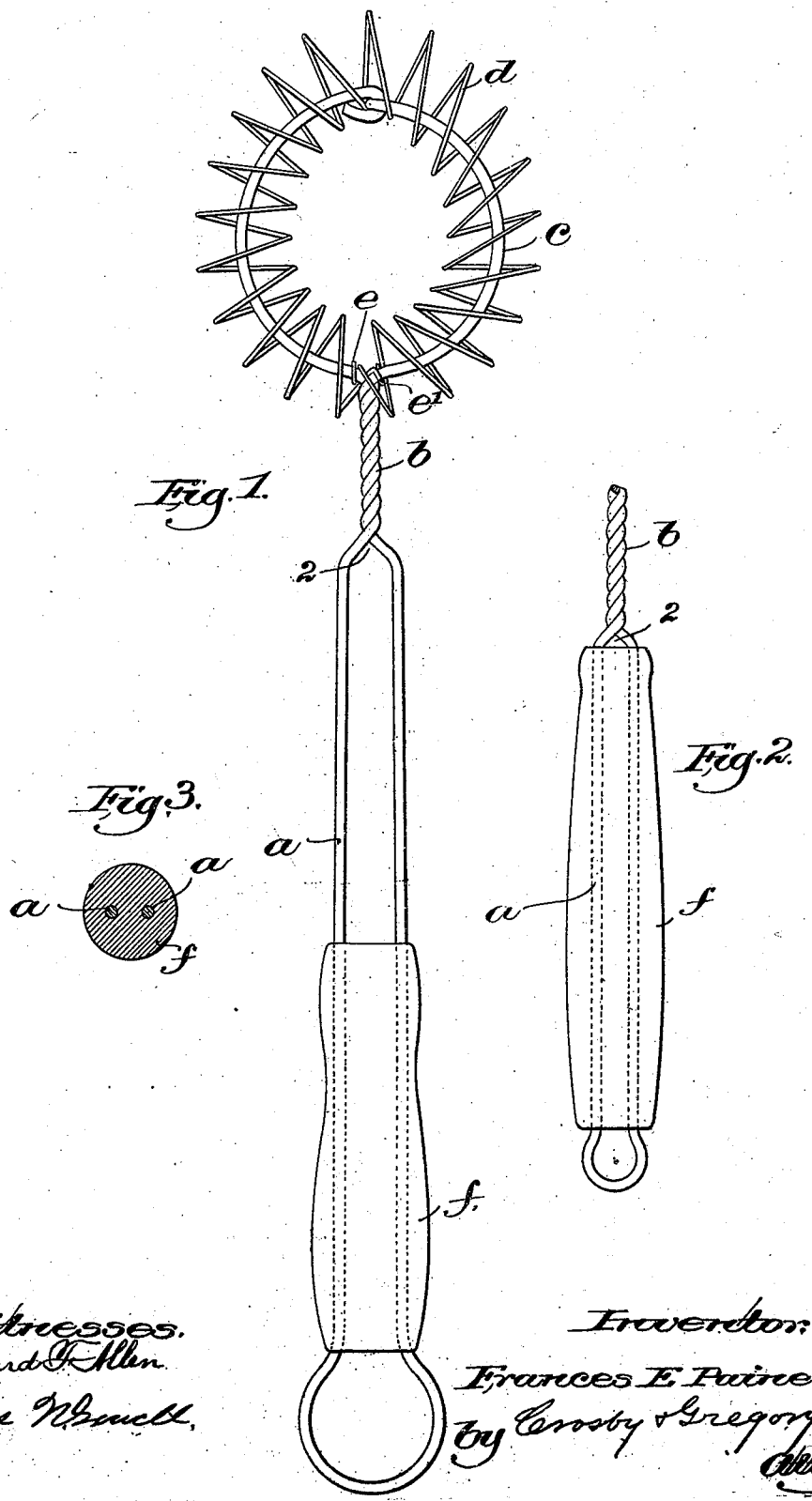

FRANCES E. PAINE, OF BOSTON, MASSACHUSETTS.

EGG-BEATER.

SPECIFICATION forming part of Letters Patent No. 504,112, dated August 29, 1893.

Application filed November 28, 1892. Serial No. 453,340. (No model.)

*To all whom it may concern:*

Be it known that I, FRANCES E. PAINE, of Boston, county of Suffolk, State of Massachusetts, have invented an Improvement in Culinary Beaters, of which the following description, in connection with the accompanying drawings, is a specification, like letters and numerals on the drawings representing like parts.

This invention has for its object the production of a cheap and efficient beater, simple and durable in construction, and adapted to beat eggs, cake, &c., the beater presenting a large flexible beating surface, and being readily cleansed.

My invention consists in a culinary beater having a rigid wire handle and supporting loop, and a flexible beating surface composed of a fine wire surrounding the supporting loop in a loose spiral, substantially as will be described.

Figure 1, of the drawings represents a front view of a beater embodying my invention. Fig. 2, in a modification thereof; and Fig. 3, is a sectional detail to be described.

I have herein shown the beater as composed of a stout wire bent upon itself to form a long flat loop-like handle $a$, the sides of said loop converging toward the point 2, where the wires are united preferably by twisting them together, as at $b$, the twisting serving as a rigid connection between the handle and the supporting loop $c$, the latter being made by separating the wires and connecting their ends one to the other, the loop $c$ thus made being herein shown as substantially circular, but it is evident that it might differ in shape and yet be within the scope of this invention. Around the supporting loop $c$ I wind a loose spiral $d$ of finer wire than the wire forming the handle and supporting loop, and I preferably connect the ends of said spiral to the supporting loop as at $e, e'$. This spiral possesses great flexibility and presents a large surface to act upon the material to be beaten, while the rigid handle and supporting loop permit a firm grasp of the operator's hand and a positive movement of the loop $c$ and spiral $d$. The simple construction makes the beater very durable and cheap, there is nothing to get out of order, and it is readily cleansed.

In order to protect and afford a better grasp for the hand of the operator, I have provided the handle $a$ with a hand piece $f$, preferably circular in cross section, see Fig. 3, through which longitudinal holes are bored to receive the two sides of the wire handle, thus preventing any twisting of the hand piece.

In the modification shown in Fig. 2, I have extended the twisted part $b$ to the inner end of the hand piece, making any longitudinal movement thereof impossible.

The handle may be made of wood, bone, or any suitable material.

I claim—

1. In a culinary beater, a supporting loop, a sustaining handle, and a flexible wire beating surface surrounding the loop loosely, to operate, substantially as described.

2. A culinary beater having a rigid wire handle and supporting loop, and a flexible beating surface composed of a fine wire surrounding the supporting loop in a loose spiral, substantially as described.

3. A culinary beater consisting of a stiff wire bent upon itself to form a flat loop-like handle and a supporting loop, the two parts of the wire being twisted and forming a rigid connection between said loop and handle, and a fine wire surrounding the supporting loop in a loose spiral to form a flexible beating surface, substantially as described.

4. In a culinary beater, a supporting loop, a sustaining handle provided with a rigid hand piece, and a flexible wire beating surface surrounding the loop loosely, to operate, substantially as described.

5. A culinary beater consisting of a stiff wire bent upon itself to form a flat loop and a supporting loop, a hand piece surrounding the flat loop, the two parts of the wire being twisted and forming a rigid connection between said loop and hand piece, and a fine wire surrounding the supporting loop in a loose spiral to form a flexible beating surface, substantially as described.

In testimony whereof I have signed my name to this specification in the presence of two subscribing witnesses.

FRANCES E. PAINE.

Witnesses:
EDWARD F. ALLEN,
FREDERICK L. EMERY.